United States Patent [19]

Torruellas et al.

[11] Patent Number: 5,659,561
[45] Date of Patent: Aug. 19, 1997

[54] SPATIAL SOLITARY WAVES IN BULK QUADRATIC NONLINEAR MATERIALS AND THEIR APPLICATIONS

[75] Inventors: William E. Torruellas, Orlando; George I. Stegeman, Maitland, both of Fla.; Lluis Torner, Berga, Spain

[73] Assignee: University of Central Florida, Orlando, Fla.

[21] Appl. No.: 470,116

[22] Filed: Jun. 6, 1995

[51] Int. Cl.$^6$ ...................................................... H01S 3/10
[52] U.S. Cl. .............................. 372/22; 372/69; 372/108; 372/93; 372/101
[58] Field of Search ........................... 375/25, 22, 21, 375/92, 69, 107, 93, 94, 108, 101, 105; 359/328

[56] References Cited

U.S. PATENT DOCUMENTS

| | | | |
|---|---|---|---|
| 5,047,668 | 9/1991 | Bosenberg | 372/21 |
| 5,144,630 | 9/1992 | Lin | 372/21 |
| 5,150,376 | 9/1992 | Ohmori et al. | 372/21 |
| 5,193,097 | 3/1993 | Bordui et al. | 372/21 |
| 5,202,892 | 4/1993 | Sleight et al. | 372/22 |
| 5,390,211 | 2/1995 | Clark et al. | 372/21 |

*Primary Examiner*—Leon Scott, Jr.
*Attorney, Agent, or Firm*—Brian S. Steinberger; Law Office of Brian S. Steinberger

[57] ABSTRACT

This invention encompasses generating electromagnetic solitary waves in two-transverse spatial dimensions. These wave beams propagate without diffraction and are equivalent to the normal modes of propagation of a nonlinear system governed by second order optical nonlinearities. The wave beams can be generated using optical techniques and will impact a wide variety of geometries and operating conditions whenever second order nonlinear optical processes are implemented for harmonic and parametric optical conversion. A preferred embodiment covers the generation of solitary waves from nonlinear materials such as KTiOPO$_4$ (KTP) crystals. Other types of nonlinear optical device crystals can also be used such as KH$_2$PO$_4$(KDP), (NH$_2$)$_2$CO (Urea), LiNbO$_3$, KNbO$_3$, and the borate crystals BaB$_2$O$_4$ (BBO) and LiB$_3$O$_7$(LBO).

3 Claims, 17 Drawing Sheets

SPATIAL SOLITARY WAVES IN BULK QUADRATIC NONLINEAR MATERIALS AND THEIR APPLICATIONS

This invention relates to solitons, and in particular to methods and apparatus for generating solitary waves in nonlinear materials such as KTiOPO$_4$(KTP) crystals.

BACKGROUND AND PRIOR ART

Solitons can generally be defined as a member of a class of solutions to nonlinear equations or non linear propagation problems. Such solutions can be characterized by certain amplitude or power levels and certain pulse shapes that can be interrelated, where the solutions can propagate with an unchanging pulseshape over an indefinite distance, or can display a slow periodic oscillation with distance through a set of recurring characteristic pulseshapes. Depending on the particular nonlinear equation, the soliton pulses can have different shapes and the velocities of propagation and the distances for periodic recurrence generally depend on both the nonlinear equation and the pulse amplitude.

Since the invention of the Laser various physical phenomena have been used to confine light with light. The required processes invoke a local increase in the optical refractive index primarily due to the third or even higher order nonlinear optical response of a material. In particular, for laser beams free to diffract in two-transverse dimensions, which is our geometry, saturable third order processes have been implemented for this purpose. They suffer from the requirement that the necessary higher order response is typically available only near a resonance condition which usually is accompanied by inherent optical losses. The required large saturable nonlinearities have mainly been achieved in atomic gas systems. See J. E. Bjorkholm, A. Ashkin, "cw *Self-Focusing and Self-Trapping of Light in Sodium Vapor*", Phys. Rev. Lett., 32, 129–132 (1974).

When only one transverse dimension of an optical beam is allowed to diffract, the second one being confined by strong linear wave-guiding, one dimensional spatial solitons are possible and have been observed in a few dense transparent third order nonlinear optical materials where excellent planar waveguides can be fabricated. See A. Barthelemy, S. Mancur, C. Froehly, "*Propagation soliton et auto-confinement de faisceaux laser par non-linearite optique de Kerr*", Opt. Comm., 55, 201–206 (1985); and See J. S. Aitchison, A. M. Weiner, Y. Silberberg, M. K. Oliver, J. L. Jackel. D. E. Leaird, E. M. Vogel, P. W. E. Smith, "*Observation of spatial optical solitons in a nonlinear glass waveguide*", Opt. Lett. 15, 471–473 (1990).

Because of the transparency requirement the latter methods suffer from extreme light intensifies and are only applicable to one free transverse dimension. Indeed, mathematically in more than one dimension the equation which governs the propagation of a single field in a material with an intensity-dependent refractive index does not lead to solitary beams (similar to solitons but with different collision properties) and in general unstable filaments occur. Solving the latter problems, photorefractive solitons have successively been demonstrated in more than one dimension at milliwatt power levels. However in order to achieve the photorefractive effect electrical carriers in the material have to be created, resulting in optical losses, just like in atomic systems. See G. C. Duree, J. L. Shultz, G. J. Salamo, M. Segev, A. Yariv, B. Crosignani, P. D. Porto, E. J. Sharp, R. R. Neurgaonkar, "*Observation of Self-Trapping of an Optical Beam Due to the Photorefractive Effect*", Phys. Rev. Lett., 71, 533–536 (1993).

Furthermore, because of the necessary formation and diffusion of photocarriers the photorefractive effect exhibits an inherently slow response. Recently it has been realized that lower order nonlinearities, second order processes, in noncentrosymmetric dense optical media could lead to effects equivalent to those observed in third order nonlinear optical materials, namely self focusing and defocusing. See R. deSalvo, D. J. Hagan, M. Sheik-Bahae, G. I. Stegeman, E. W. VanStryland, H. Vanherzeele, "Self-focusing and self-defocusing by cascaded second-order effects in KTP", Opt. Lett., 18, 28–30 (1992). One of these effects is a nonlinear distortion of the phase front of the optical beam. See G. I. Stegeman, M. Sheik-Bahae, E. W. VanStryland, G. Assanto, "*Large nonlinear phase-shifts in second-order nonlinear-optical processes*", Opt. Lett., 18, 13–15 (1993). Theoretically the power law dependence of the phase distortion on the input optical field led to the prediction of solitary beams of higher dimension than one. See Y. N. Karamzin, A. P. Sukhorukov, "Mutual focusing of high-power light Sov. Phys.-J.E.T.P., 41, 414–420 (1976). This includes the two-dimensional case. Full theoretical treatments indeed prove that such soliton-like beams should exist in quadratic media. See Y. N. Karamzin, A. P. Sukhomkov, "Mutual focusing of high-power light Sov.Phys.-J.E.T.P., 41, 414–420 (1976); and See K. Hayata, M. Koshiba, "*Multidimensional Solitons in Quadratic Nonlinear Media*", Phys. Rev. Lett., 71, 3275–3278 (1993); and See L. Torner, C.R. Menyuk, W. E. Torruellas, G. I. Stegeman, "*Two-dimensional solitons with second-order nonlinearities*", Opt. Lett., 20, 13–15 (1995).

In the so called "cascading" scheme, second harmonic is generated in the crystal. When this harmonic field mixes back with the fundamental field, the down-converted fields interfere with the fundamental which was not converted to second harmonic, resulting in optical phase distortions in all of the fields linked by the process. This approach can lead to effective third order nonlinearities larger than those observed in intrinsic third order materials. But one should note that in this case the local refractive index remains unchanged, only a distortion of the optical phase front is produced. The nonlinear phase distortion intrinsically saturates when the three fields involved are strongly coupled via the second order polarization, and is proportional to the field amplitudes and not their intensities.

Various U.S. patents have been granted generally along the line of generating time dependent solitary waves along superconductors and optical fibers. For example, U.S. Pat. Nos. 4,361,768 to Rajeevakumar; 5,134,621 to Marshall; 5,157,744 to Korotky; 5,305,006 to Lee; and 5,381,397 to Okada describes various two dimensional time dependent soliton generation systems for superconductors. U.S. Pat. Nos. 4,635,263 to Mollenauer; 4,881,788 to Doran; 5,305,336 to Adar; 5,140,656 to Hasegawa et al.; 5,191,628 to Byron; 5,195,160 to Byron; 5,201,017 to Byron; 5,357,364 to Gordon et at.; 5,363,386 to Smith describes soliton generation along optical fiber that are also only time dependent.

SUMMARY OF THE INVENTION

The first objective of the present invention is to provide a method of generating solitary waves in nonlinear materials.

The second object of this invention is to provide a method of generating solitary waves in KTiOPO$_4$ (KTP) crystals.

The third object of this invention is to provide a method of generating multidimensional solitary waves that are not time dependent.

The fourth object of this invention is to provide high spatial quality, stable diffraction-less beams in bulk quadratic nonlinear optical media for efficient harmonic or parametric generation devices or for cleaning up optical beams.

The fifth object of this invention is to compensate for natural walk-off between beams due to birefrigence.

This and other objects and advantages are achieved in accordance with the subject invention by focusing one or more two-dimensional laser beams onto a quadratic nonlinear medium close to the phase matched condition for the nonlinear wave-mixing of the beams to occur. The length of the crystal is chosen so that it exceeds both the diffraction length and the linear walk-off length. The nonlinear length, e.g. the length for which the second harmonic starts to downconvert effectively into the fundamental is chosen to be smaller than both the diffraction and walk-off lengths. Equivalently the input power has to be chosen so that the previously mentioned condition occurs and is obviously less than the possible optical damage threshold. (See FIG. 2. Flow Chart)

Experiments for the subject invention show that a new phenomenon, spatial "solitary wave locking" occurs for a wide range of geometries and experimental parameters. For instance the output is independent of the phase-mismatch condition beyond a given locking threshold. Although it is presently not known, the largest phase-mismatch possible for soliton-locking has been observed to date to be for absolute values of the phase-mismatch up to $5\pi$. On the other hand the threshold for solitary wave locking depends on the phase mismatch, which is defined by the geometry and/or birefringence and/or dispersion of the quadratic crystal.

In a preferred embodiment, experiments demonstrated spatial solitary wave generation using nonlinear materials that included $KTiOPO_4$ (KTP) crystals.

The applications of the subject invention will take advantage of the inherent high quality beams (amplitudes and phase fronts) generated using this approach.

Further objects and advantages of this invention will be apparent from the following detailed description of a presently preferred embodiment which is illustrated schematically in the accompanying drawings.

DESCRIPTION OF THE PREFERRED EMBODIMENT

Before explaining the disclosed embodiment of the present invention in detail it is to be understood that the invention is not limited in its application to the details of the particular arrangement shown since the invention is capable of other embodiments. Also, the terminology used herein is for the purpose of description and not of limitation.

Figure 1:
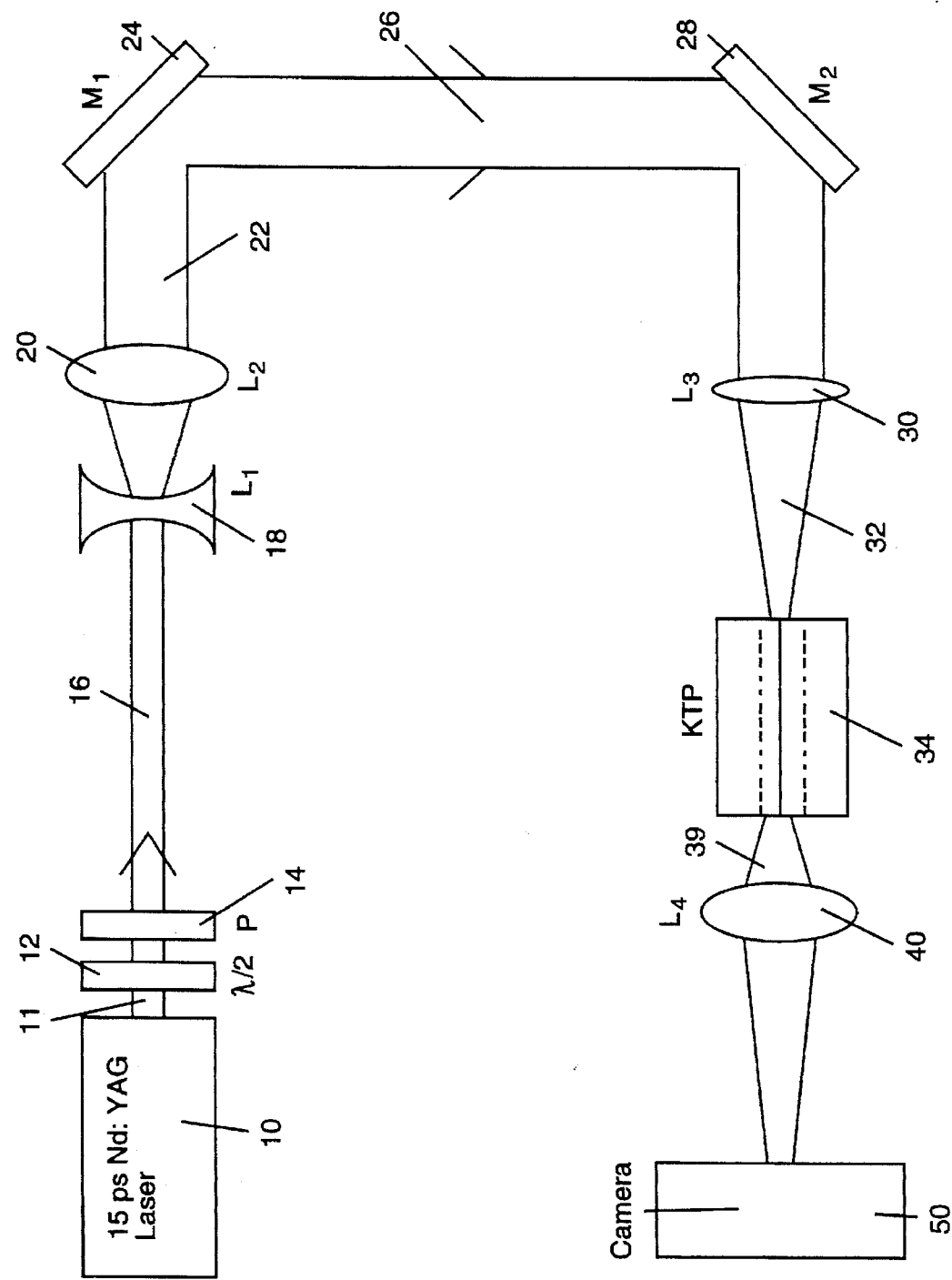
FIG. 1 is an experimental set-up used to demonstrate 2D spatial (two dimensional) solitary wave formation according the subject invention.

Referring to FIG. 1, 15 psec (HWHM) Nd:YAG mode-locked and Q-switched laser 10 was attenuated with a half wave plate (½), and polarizer combination (P) 12, 14. A telescope formed with lenses $L_1$ 18 and $L_2$ 20 was used to magnify the beam size by a factor of 3. Mirrors $M_1$ 24 and $M_2$ 28 allowed for careful alignment and lens $L_3$ 30 focused the fundamental beam 32 to a spot radius ($HW@1/e^2$, where e is defined as 2,7182818) of 20 µm. A 1 cm long KTP crystal 34, which corresponds to 5 diffraction lengths inside of the crystal 34, was cut for type II phase matching at 1064 nm. The output face of the KTP crystal 34 was imaged with lens $L_4$ 40 onto a Charged-Coupled-Device camera 50 with a lateral magnification of 10.

Although in our demonstration apparatus we used a pulsed laser 10 our approach can be implemented in the CW regime with large enough and long enough nonlinear crystals. Similarly a focusing lens $L_3$ 30 is not always needed to form solitary beams in a bulk second order nonlinear crystal.

Referring to FIG. 1, the picosecond Nd:YAG laser 10 emitting 1064 nm 15 psec pulses 11 was used and the choice of the wavelength allowed for two conditions in the Flow Chart of FIG. 2(to be discussed later) to be verified. The KTP crystal 34 at both the fundamental and second harmonic frequencies is transparent with negligible linear losses for propagations of 1 cm. Further, KTP crystals such as the one shown in FIG. 1, are known for their wide acceptance bandwidth (1 nm in our case where the laser bandwidth was less than 0.05 nm) and relatively large temporal walk-off and temporal dispersion lengths, 3 cm and 100s of meter respectively for 15 psec pulses at 1064 nm. Referring again to FIG. 1, a half-wave plate polarizer combination 12, 14 was used to control the input fundamental pulse energy 16. A telescope formed by lenses $L_1$ 18 and $L_2$ 20 in addition to $L_3$ 30 were used to focus the 1064 nm laser beam 11 to a spot, 20 μm in radius 32, at the entrance of the type II KTP crystal 34. The latter beam waist was chosen so that the second set of conditions in the Flow Chart of FIG. 2 could be verified. Namely the length of the crystal 34, 1 cm, was 5 times the diffraction length and the walk-off length was approximately half the sample length.

Figure 2:
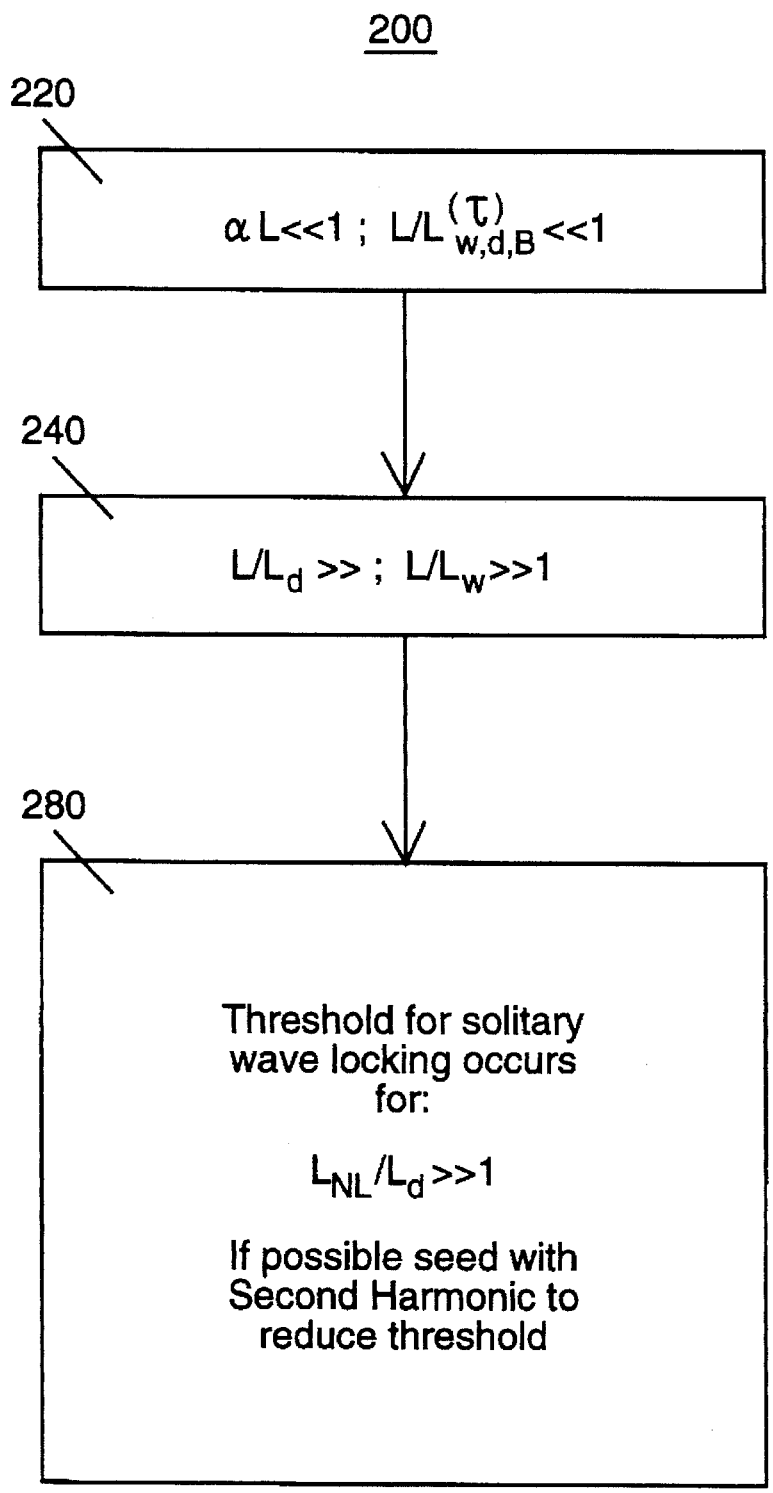
FIG. 2 is a flow chart of the preferred invention of FIG. 1.

FIG. 2 is a flow chart of the three main steps 220, 240 and 280 for solitary wave formation in the experimental set-up of FIG. 1. Referring to step 220 in FIG. 2, $\propto(cm^{-1})$ refers to possible linear losses for the fields involved. L is the sample length. The first inequality defines a length shorter than the loss length $1/\alpha$. The second inequality defines a sample length longer than the temporal walk-off length, the temporal dispersion length and the acceptance bandwidth of the phase matched process. The temporal walk off length is typically given as the ratio of the pulse width and the difference of the inverse of the group-velocities of the different fields involved. The temporal dispersion length is defined as the ratio of the square of the pulse-width and the group-velocity-dispersion of the material. The spectral acceptance bandwidth is for example in the case of (oe-e', where o is the ordinary fundamental wave input, e is the extraordinary input, and e'refers to the extraordinary SHG) phase matching in the KTP crystal 34 of FIG. 1 is given by equation (1):

$$\Delta\lambda = \frac{0.886\lambda_1}{L\left[\frac{dn_1^o}{d\lambda} + \frac{dn_1^e(\theta)}{d\lambda} - 2\frac{dn_2^e(\theta)}{d\lambda}\right]} \quad (1)$$

Where:

L is the sample length and the bandwidth is defined by the laser.

$n_1$ is the fundamental refractive index, $n_2$ is the second harmonic refractive index, o-e refers to either ordinary or extraordinary wave, $\lambda$ is the fundamental wavelength, and $\theta$ is the phase matching angle inside the crystal.

When the linear loss and bandwidth conditions are verified: The length of the sample is defined in equation (2) to be larger than the diffraction length ($L_d$) and in equation (3) to be larger than the Birefringent walk-off length ($L_w$). See Step 240 of FIG. 2.

Diffraction Length $$L_d = \pi w_o^2 n/\lambda \quad (2)$$

where: $w_o$ is the half beamwidth at $1/e^2$ intensity point; n is the linear refractive index and $\lambda$ is the optical wavelength in vacuum.

Birefringent Length $$L_w = 2\pi w_o/\tan(\delta) \quad (3)$$

Where: $\tan(\delta)$ is the tangent of the Birefringent walk-off angle.

The input power is then increased to have a nonlinear length as shown in equation (4) that is exceeding the linear diffraction length.

Nonlinear Length (Step 280 of FIG. 2)

$$L_{NL} = 1/K\ E(0) \text{ (at phase matching)} \quad (4)$$

Where:

K is the nonlinear coupling coefficient defined as $K = d_{eff}/[2n^3c^3\epsilon_o]^{1/2}$, $d_{eff}$ being the effective nonlinear coefficient, c is the speed of light in a vacuum, n is the optical refractive index, $\epsilon_o$ being the vacuum permittivity, and E(0) being the input field which can include a seeded second harmonic portion).

The final step, 280 of FIG. 2 allows for 2 or more degrees of freedom in controlling the generation and propagation of the solitary of the solitary waves, namely: (1) the SHG Field Amplitude; and (2) the SHG phase respect to the fundamental.

Figure 3:
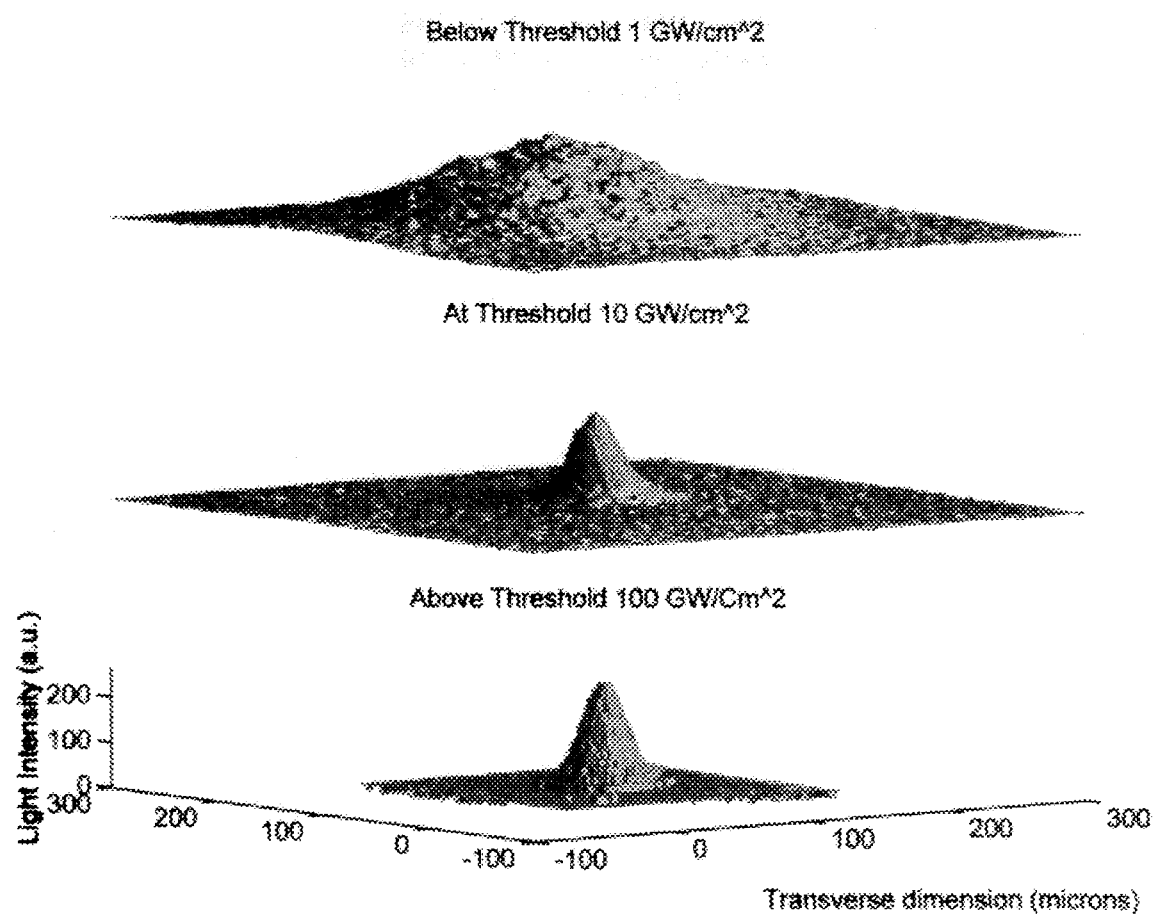
FIG. 3 is the imaged output of the 1 cm long KTP crystal showing the effects of diffraction at low input power levels and beyond the solitary locking threshold.

FIG. 3 is the imaged output of the 1 cm long KTP crystal showing the effects of diffraction at low input power levels and beyond the solitary locking threshold. FIG. 3 shows the dramatic effect of increasing the input peak intensity near phase matching, beyond a threshold power, approximately 10 GW/cm² in our case. The fundamental and second harmonic beams are locked to a narrow, 12.5 μm spot radius.

Figure 4:
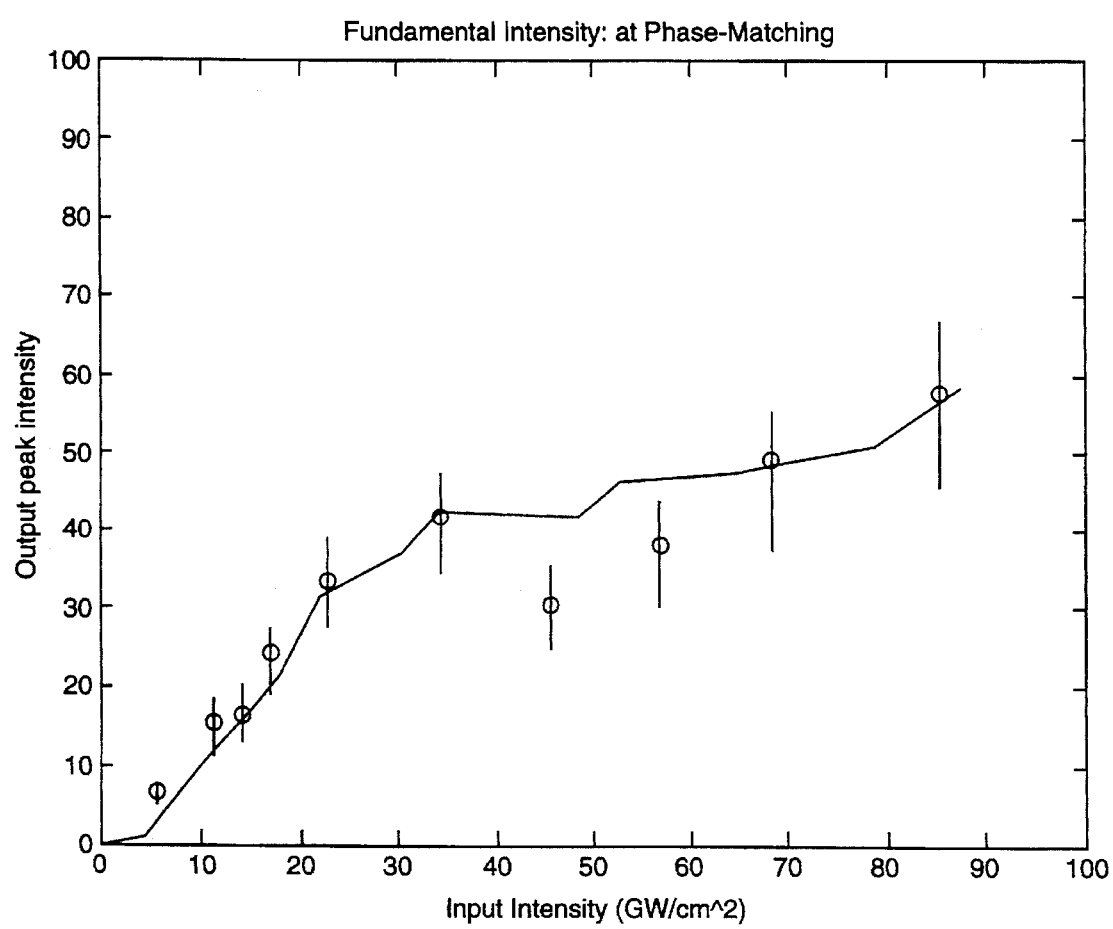
FIG. 4 is the measured output intensity for the fundamental field as a function of input intensity clearly showing that diffraction is compensated.

FIG. 4 is the measured output intensity for the fundamental field as a function of input intensity clearly showing that diffraction is compensated. The solid line shows the results of the CW numerical simulation.

Figure 5:
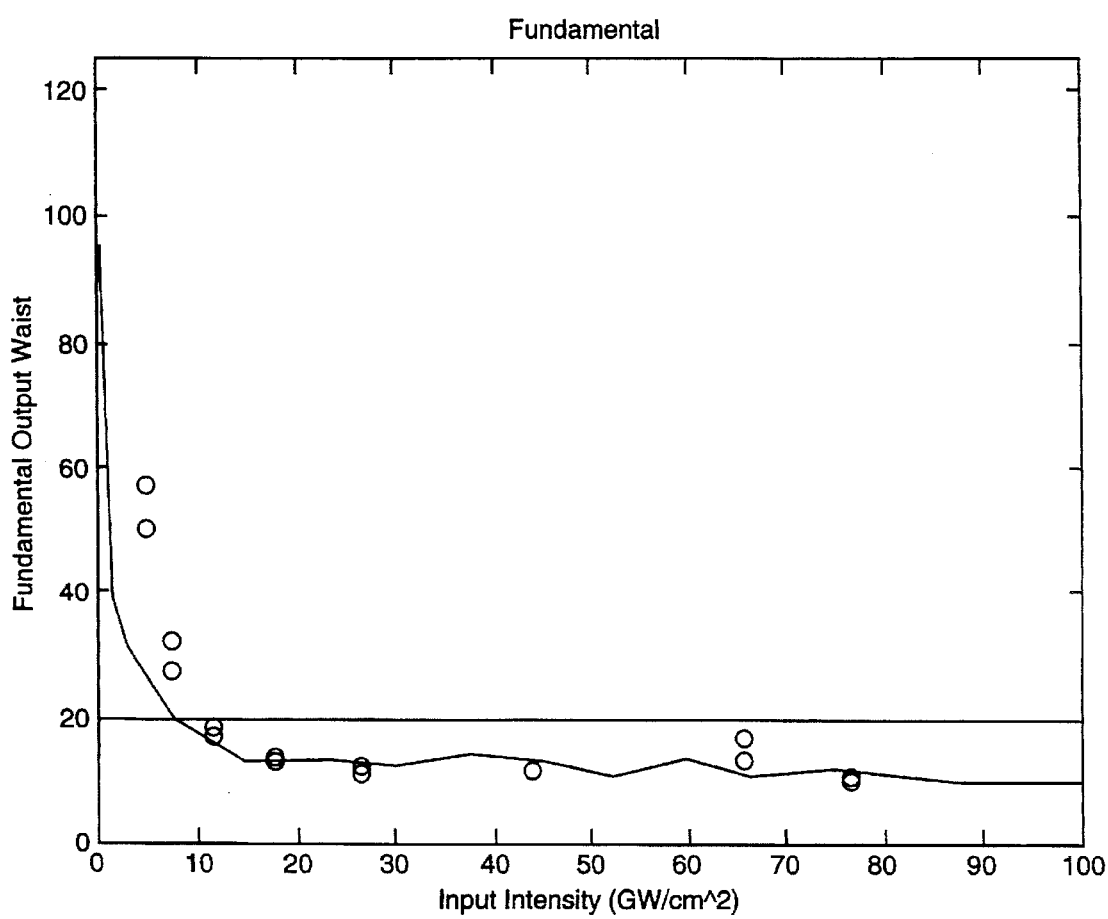
FIG. 5 is the measured output beam width ($HW@1/e^2$) as a function of input fundamental intensity.

FIG. 5 is the measured output beam width (HW@$1/e^2$) as a function of input fundamental intensity. The solid line shows the results of the CW numerical simulation. Very good agreement with the CW numerical model is found.

FIGS. 4 and 5 verify that indeed this is the case and that our measurements are well reproduced by a CW set of nonlinear coupled equations which include spatial walk-off and diffraction. They are reproduced below in equations (5), (6) and (7).:

$$\frac{\partial A_1}{\partial z} + \frac{1}{2ik_1}\left(\frac{\partial^2 A_1}{\partial x^2} + \frac{\partial^2 A_1}{\partial y^2}\right) = i\Gamma A^*_2 A_3 \exp(-i\Delta kz) \quad (5)$$

$$\frac{\partial A_2}{\partial z} - \rho_\omega \frac{\partial A_2}{\partial x} + \frac{1}{2ik_2}\left(\frac{\partial^2 A_2}{\partial x^2} + \frac{\partial^2 A_2}{\partial y^2}\right) = i\Gamma A^*_1 A_3 \exp(-i\Delta kz) \quad (6)$$

$$\frac{\partial A_3}{\partial z} - \rho_{2\omega} \frac{\partial A_3}{\partial x} + \frac{1}{2ik_3}\left(\frac{\partial^2 A_3}{\partial x^2} + \frac{\partial^2 A_3}{\partial y^2}\right) = 2i\Gamma A_1 A_2 \exp(+i\Delta kz) \quad (7)$$

where $A_{1,2}$ are the envelopes of the two orthogonally polarized fundamental fields and $A_3$ is the envelope of the second harmonic fields. $P_{\omega,2\omega}$ where $\omega$ refers to the optical radial frequency of the fundamental fields, are respectively the walk-off angles of the extraordinary fundamental and second harmonic with an extraordinary polarization, namely 0.19° and 0.28°. $\Gamma$ is the nonlinear coupling coefficient calculated to be 6 cm$^{-1}$ for an input intensity of 1GW/cm² and $\Delta kz$ is the phase mismatch.

$\delta_z$ is the longitudinal displacements in cm i is the square root of $-1$.

$k_{l,2,3}$ is the propagation vector in the material cm$^{-1}$ for fields 1, 2 and 3.

$\delta_x$, $\delta_y$ are the lateral displacements in cm.

Figure 6A:
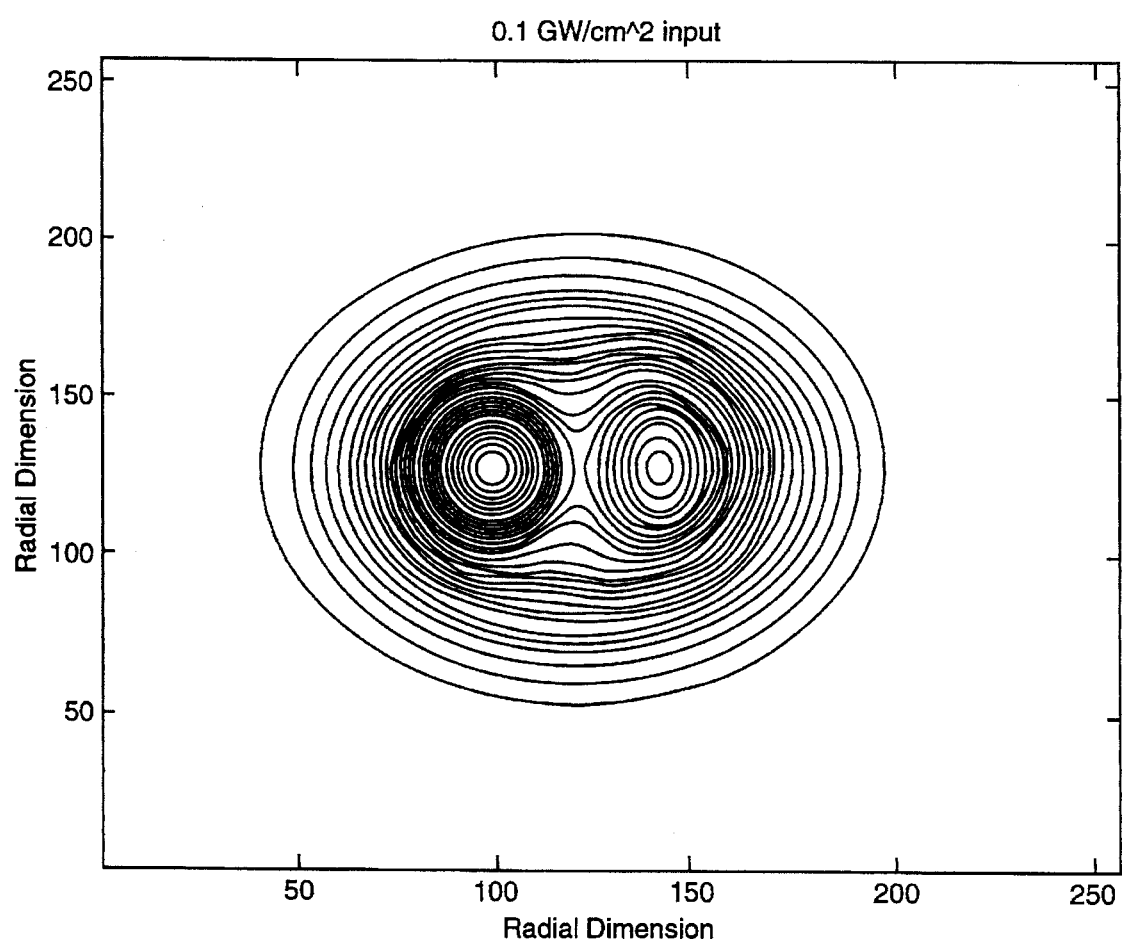
FIG. 6a is the calculated output profile before the solitary wave locking threshold for the fundamental beam.
Figure 6B:
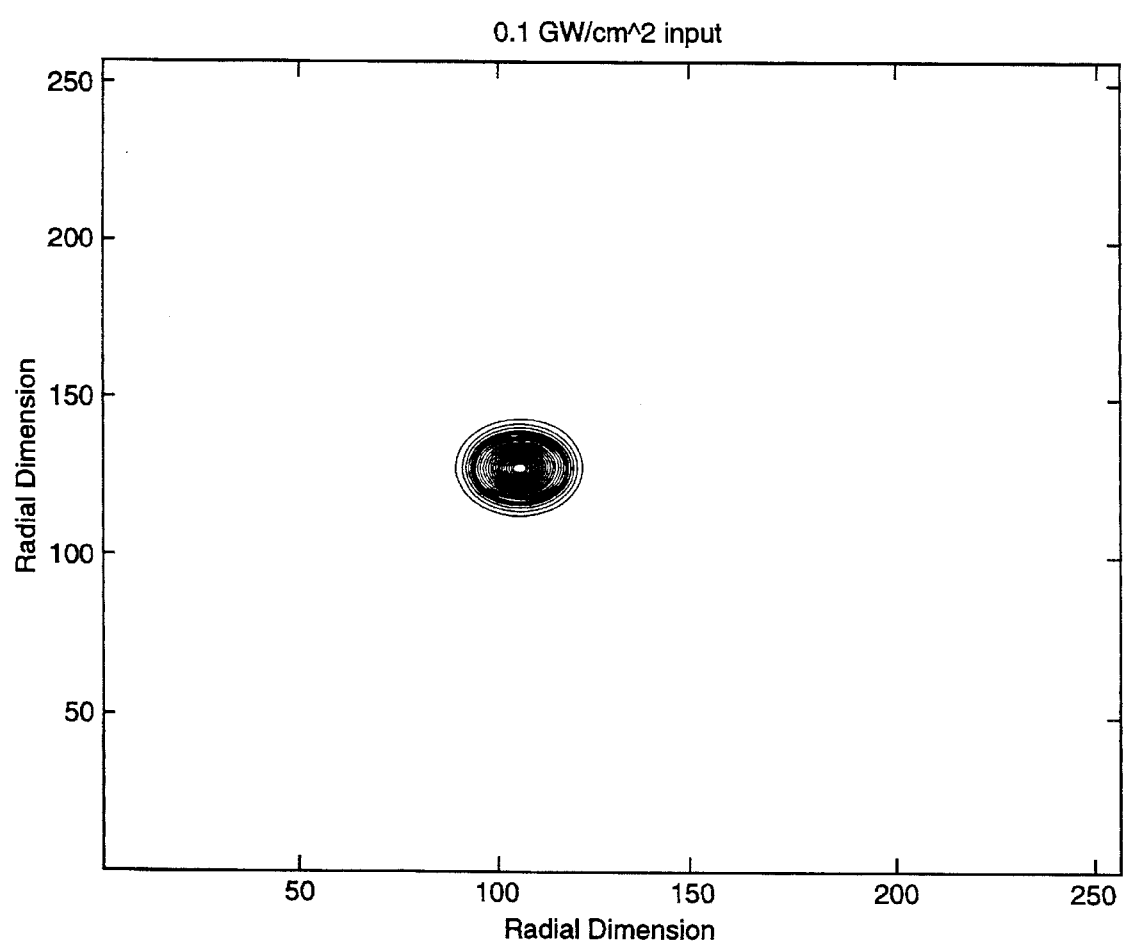
FIG. 6b is the calculated beam profile for the fundamental beam above the solitary beam locking threshold.

FIG. 6a is the calculated output profile before the solitary wave locking threshold for the fundamental beam. The lateral dimension is in units of microns for a 1 cm long KTP crystal. FIG. 6b is the calculated beam profile for the fundamental beam above the solitary beam locking threshold.

Figure 7A:
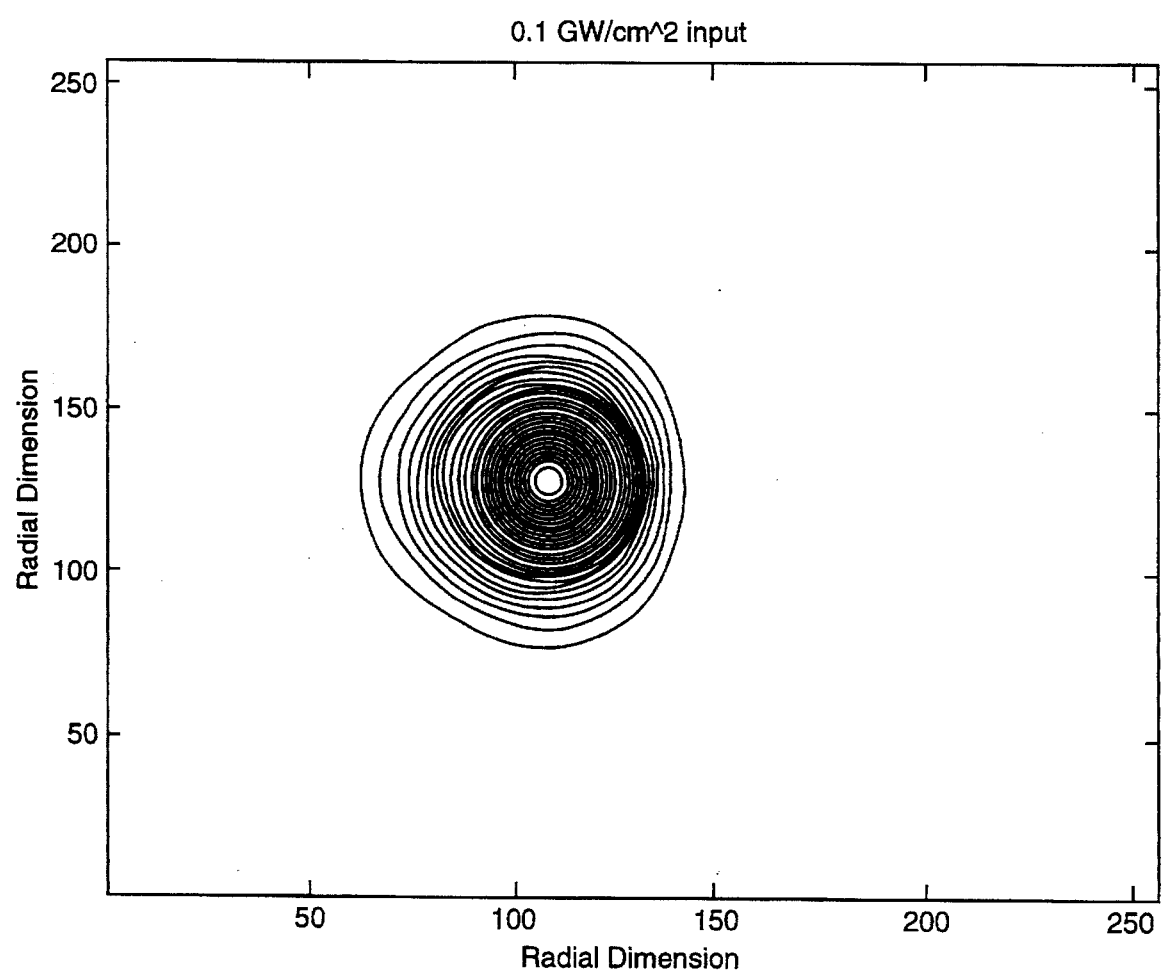
FIG. 7a is the calculated output profile before the solitary wave locking threshold for the second harmonic beam.
Figure 7B:
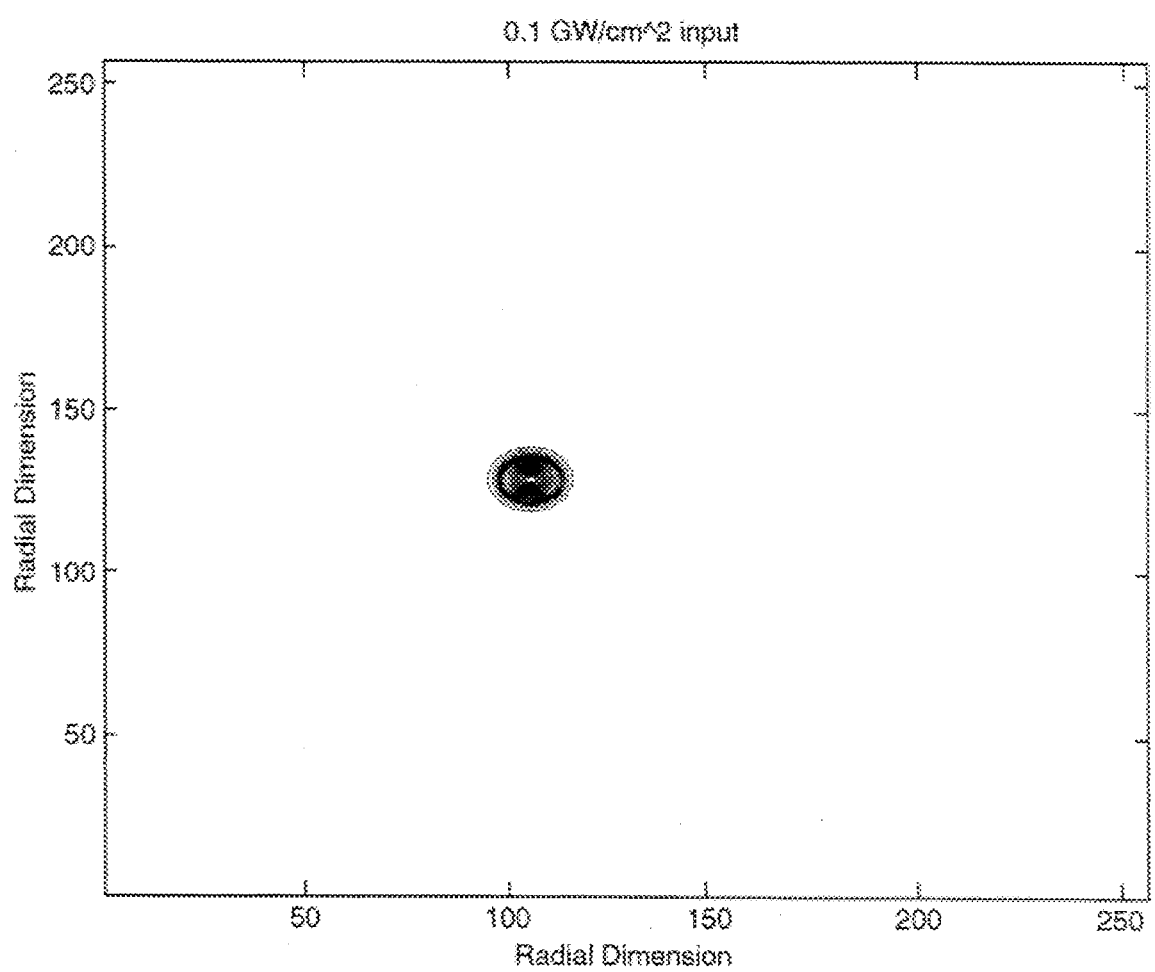
FIG. 7b is the calculated beam profile for the second harmonic beam above the solitary beam locking threshold.

FIG. 7a is the calculated output profile before the solitary wave locking threshold for the second harmonic beam. The lateral dimension is in units of microns for a 1 cm long KTP crystal. Note the large reduction in lateral dimension. FIG. 7b is the calculated beam profile for the second harmonic beam above the solitary beam locking threshold. Note the large reduction in lateral dimension.

FIGS. 6a, 6b, 7a and 7b show the self-focusing effect encountered by both the fundamental and second harmonic when the input power is increased above the locking threshold.

Figure 8A:
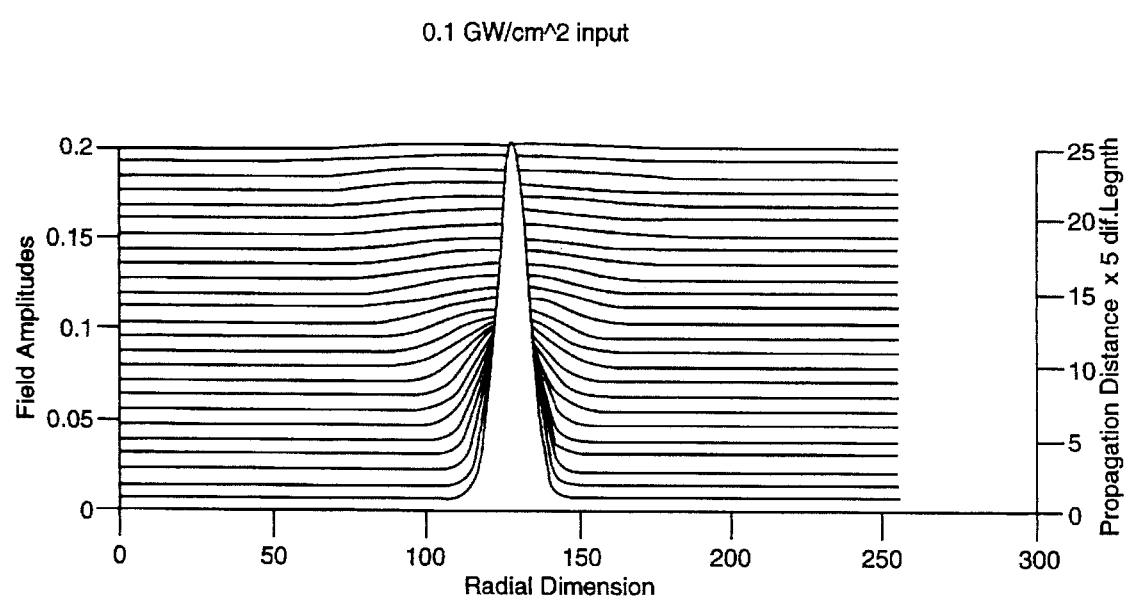
FIG. 8a is the numerical propagation results showing slices of the fundamental beam inside the KTP crystal below threshold, note the dominant effect of diffraction.
Figure 8B:
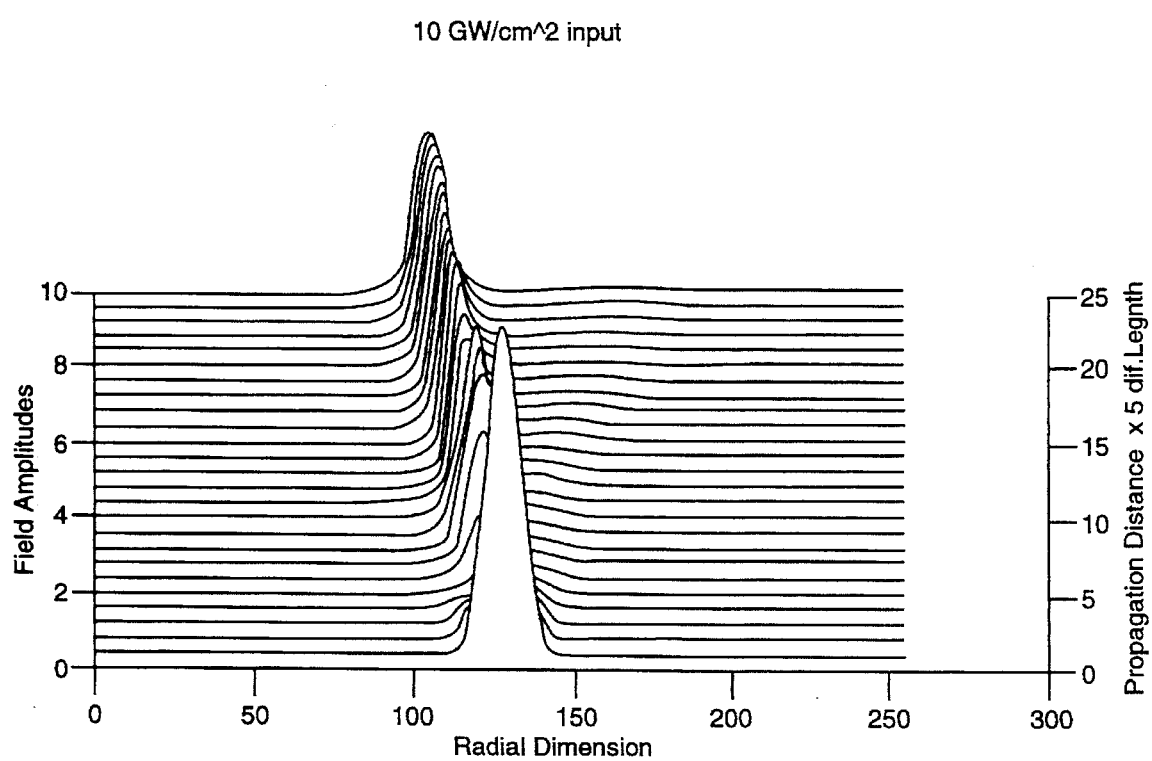
FIG. 8b shows the propagation inside the KTP crystal above the locking threshold for the fundamental beam, note the compensation of diffraction e.g. the soliton like propagation.

The evolution of both beams are then shown in FIGS. 8a, 8b, 9a and 9b. FIG. 8a is the numerical propagation results showing slices of the fundamental beam inside the KTP crystal below threshold, note the dominant effect of diffraction. FIG. 8b shows the propagation inside the KTP crystal above the locking threshold for the fundamental beam, note the compensation of diffraction e.g. the solution like propagation.

Figure 9A:
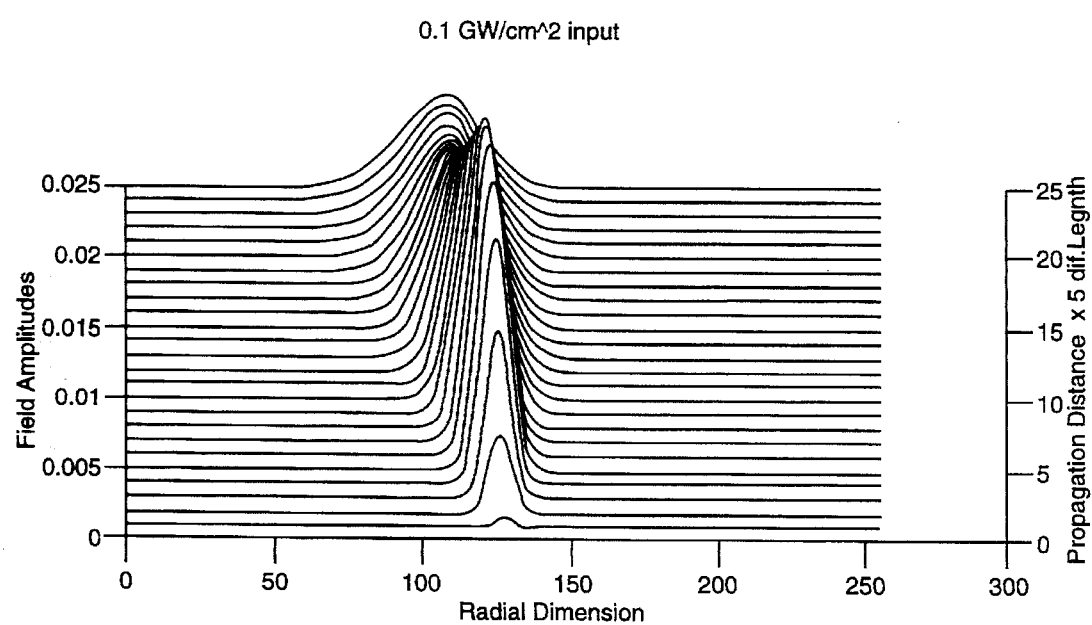
FIG. 9a shows the numerical propagation results showing slices of the second harmonic beam inside the KTP crystal below threshold, note the dominant effect of diffraction.
Figure 9B:
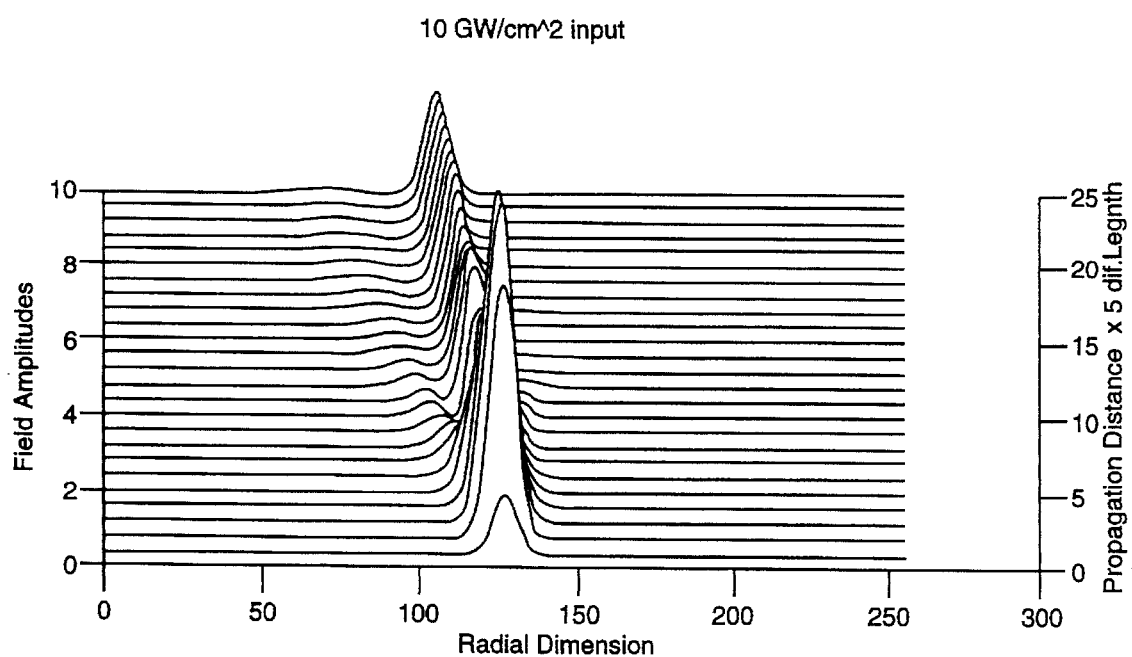
FIG. 9b shows the propagation inside the KTP above threshold for the second harmonic beam, note the compensation of diffraction e.g. the solution like propagation, and locking of the fundamental and second harmonic beams (see FIG. 8b).

FIG. 9a shows the numerical propagation results showing slices of the second harmonic beam inside the KTP crystal below threshold, note the dominant effect of diffraction. FIG. 9b shows the propagation inside the KTP above threshold for the second harmonic beam, note the compensation of diffraction e.g. the solution like propagation, and locking of the fundamental and second harmonic beams (see FIG. 8b).

FIG. 8b and 9b clearly prove the solution-like propagation when the locking threshold is reached, propagation without diffraction.

Figure 10A:
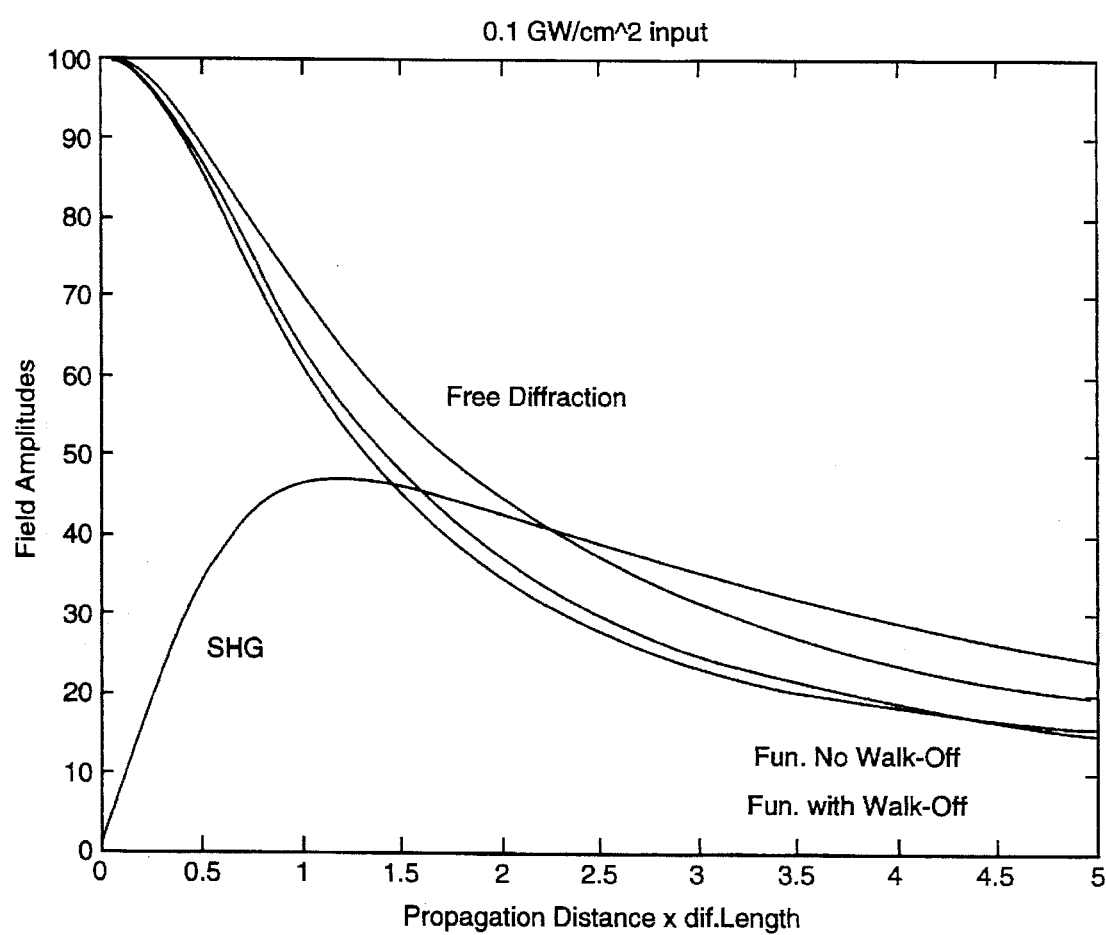
FIG. 10a shows calculated amplitudes at the peak of the field envelopes as a function of propagation distance.

FIG. 10a shows calculated amplitudes at the peak of the field envelopes as a function of propagation distance. The diffraction length was 2 mm. Below threshold diffraction dominates and saturates the SHG generation, both fundamental peak field intensities follow closely the free diffraction decay.

Figure 10B:
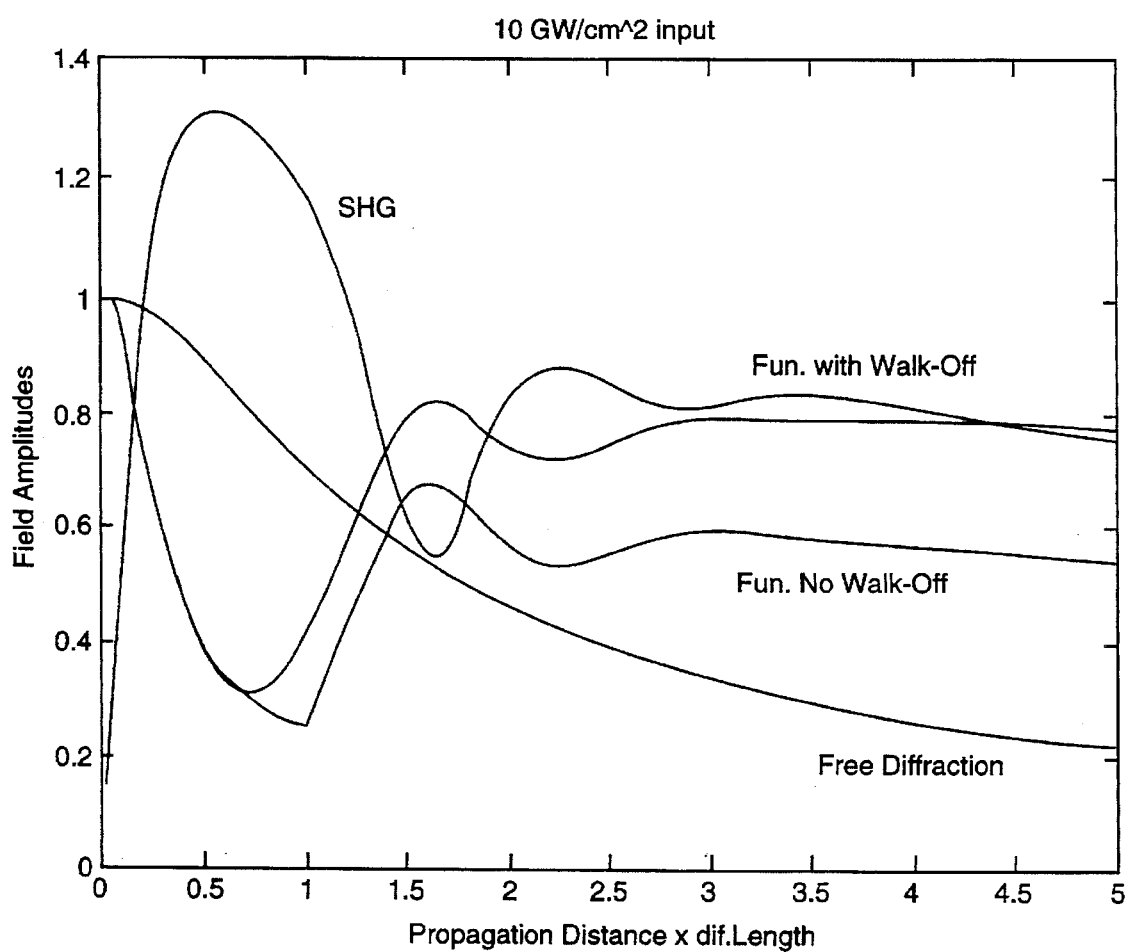
FIG. 10b shows the calculated field amplitudes above the solitary beam locking threshold.

FIG. 10b shows the calculated field amplitudes above the solitary beam locking threshold. When back conversion of the second harmonic occurs at a distance shorter than the diffraction length soilton like propagation occurs for the three fields locked in space.

When the peak intensity of the three fields involved in the interaction are plotted versus propagation distance, FIGS. 10a and 10b shows that for an intensity above the threshold power defined by the third condition of the Flow Chart of FIG. 2, namely the nonlinear length exceeds the diffraction length, diffraction is beaten and propagation without diffraction occurs after the second harmonic down converts to the fundamental. The coupling between the regenerated fundamental fields and the second harmonic produce the locking of the three fields. The latter effect is clearly demonstrated in FIGS. 11a and 11b.

Figure 11A:
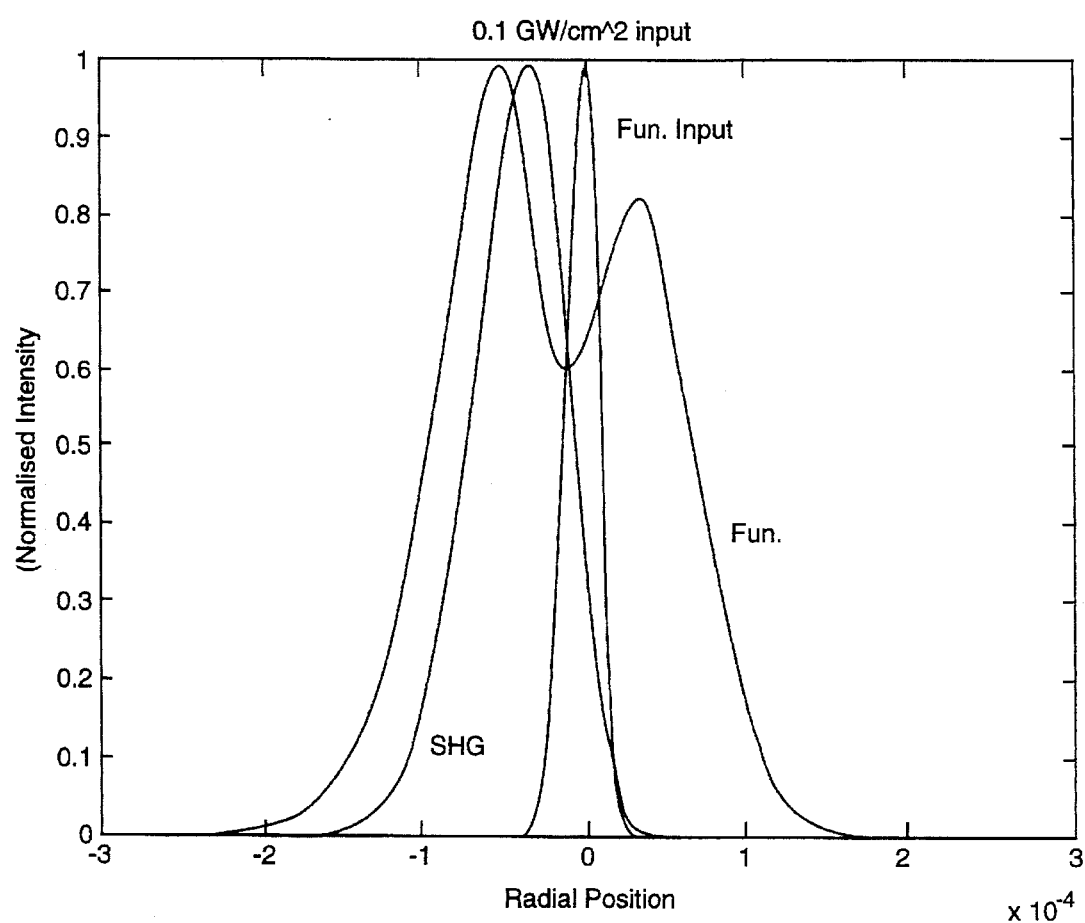
FIG. 11a shows the calculated field envelops showing the effect of SHG generation and diffraction at low input powers.

FIG. 11a shows the calculated field envelops showing the effect of SHG generation and diffraction at low input powers. The radial dimension is in units of meters, the input width (HW@1/e$^2$) was 20 μm.

Figure 11B:
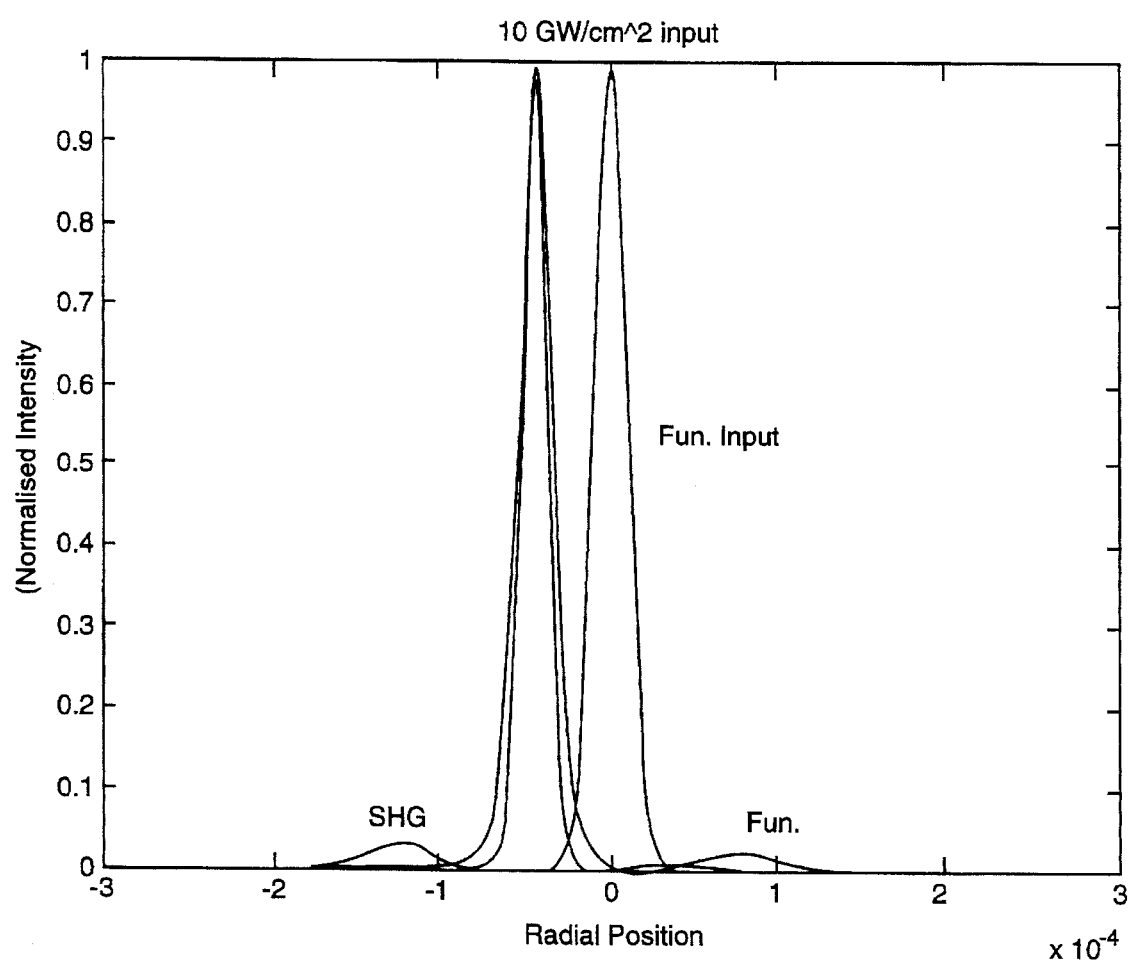
FIG. 11b is clear evidence of locking of the three beams involved in space when the input fundamental intensity exceeds the solitary locking threshold.

FIG. 11b is clear evidence of locking of the three beams involved in space when the input fundamental intensity exceeds the solitary locking threshold.

Applications of the solitary wave locking previously described play a significant role in the design of harmonic and parametric generators, not only in the free space propagating geometry described here but also in oscillator geometries. This approach alleviates the mechanical and thermal requirements imposed traditionally by critical phase matching geometries. Similarly the crystal uniformity necessary for an efficient quadratic generation in traditional setups can be lowered using the solitary wave locking approach. Finally, the quality level of the input beams typically defined with the M$^2$ parameter can be lowered.

Although the preferred embodiment describes KTP crystals, other types of nonlinear optical device crystals can also be used such as $KH_2PO_4$(KDP), $(NH_2)_2CO$(Urea),, $LiNbO_3$, $KNbO_3$, and the borate crystals $BaB_2O_4$(BBO) and $LiB_3O_7$(LBO).

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

We claim:

1. A method for solitary wave generation in bulk quadratic non linear crystals with a laser, comprising the steps of:

(A) calculating a spectral acceptance bandwidth in a bulk quadratic non linear crystal by the equation:

$$\Delta\lambda = \frac{0.886\lambda_1}{L\left[\frac{dn_1^o}{d\lambda} + \frac{dn_1^e(\theta)}{d\lambda} - 2\frac{dn_2^e(\theta)}{d\lambda}\right]}.$$

wherein L is sample length and bandwidth defined by a laser, $n_1$ is the fundamental refractive index, $n_2$ is the second harmonic refractive index, e refers to either ordinary or extraordinary wave, $\lambda$ is the fundamental wavelength, and $\theta$ is the phase matching angle inside the crystal;

(Bi) Calculating a diffraction length ($L_d$) by the equation:

$L_d=\pi w_o^2 n/\lambda$, wherein $w_o$ is the half beamwidth at 1/e$^2$ intensity point; n is the linear refractive index and $\lambda$ is the optical wavelength in vacuum;

(Bii) Calculating a Birefringent length by the equation:

$L_w=2\pi w_o/\tan(\delta)$, wherein $\tan(\delta)$ is the tangent of the Birefringent walk-off angle; and (C) Calculating a Nonlinear length($L_{NL}$) by the equation:

$L_{NL}=1/k$ E(0) at or near phase matching in the bulk quadratic non linear crystal, wherein k is the nonlinear coupling coefficient defined as $k=d_{eff}/[2n^3c^3\epsilon_o]^{1/2}$, w is the optical angular frequency, $d_{eff}$ being the effective nonlinear coefficient, c is the speed of light in a vacuum, n is the optical refractive index, $\epsilon_o$ being the vacuum permittivity, and E(0) being the input field which can include a seeded second harmonic portion, wherein solitary wave generation occurs in the nonlinear bulk quadratic crystal when the $L_{NL}$ is greater than the $L_d$.

2. A laser system for generating spatial solitary waves in bulk quadratic nonlinear crystals comprising:

a laser source for emitting an optical beam;

a telescope means for expanding the optical beam into a two dimensional laser beam;

a lens means for focussing the two dimensional laser beam into a selected spot size;

a bulk quadratic nonlinear crystal at or near phase matching for receiving the selected spot size at an entrance face, and for generating a solitary wave when a nonlinear length of the crystal ($L_{NL}$)is greater than a diffraction length of the crystal ($L_d$), and an acceptance spectral bandwidth of the crystal is calculated by $\Delta\lambda$, wherein $L_{NL}=1/k$ E(0), wherein k is the nonlinear coupling coefficient defined as $k=d_{eff}/[2n^3c^3\epsilon_o]^{1/2}$, w is the optical angular frequency, $d_{eff}$ being the effective nonlinear coefficient, c is the speed of light in a vacuum, n is the optical refractive index, $\epsilon_o$ being the vacuum permittivity, and E(0) being the input field which can include a seeded second harmonic portion, $L_d = \pi w_o^2 n/\lambda$, wherein $w_o$ is the half beamwidth at $1/e^2$ intensity point; n is the linear refractive index and $\lambda$ is the optical wavelength in vacuum, and $$\Delta\lambda = \frac{0.886\lambda_1}{L\left[\frac{dn_1^o}{d\lambda} + \frac{dn_1^e(\theta)}{d\lambda} - 2\frac{dn_2^e(\theta)}{d\lambda}\right]}.$$

wherein L is sample length and bandwidth defined by the laser, $n_1$ is the fundamental refractive index, $n_2$ is the second harmonic refractive index, e refers to either ordinary or extraordinary wave, $\lambda$ is the fundamental wavelength, and $\theta$ is the phase matching angle inside the crystal.

3. A laser system for producing solitary waves in nonlinear bulk quadratic crystals comprising:

a laser source for emitting a laser beam;

means for selecting a polarization characteristic specific to the phase matching of a nonlinear bulk quadratic crystal;

at least one means for focussing the polarized laser beam to a selected spot size at an entrance face of the bulk quadratic nonlinear crystal at or near phase matching, wherein solitary waves are generated when a nonlinear length of the crystal ($L_{NL}$) is greater than a diffraction length of the crystal ($L_d$), wherein $L_{NL} = 1/k\, E(0)$, wherein k is the nonlinear coupling coefficient defined as $k = d_{eff}/[2n^3c^3\epsilon_o]^{1/2}$, w is the optical angular frequency, $d_{eff}$ being the effective nonlinear coefficient, c is the speed of light in a vacuum, n is the optical refractive index, $\epsilon_o$ being the vacuum permittivity, and E(0) being the input field which can include a seeded second harmonic portion, and $L_d = \pi w_o^2 n/\lambda$, wherein $w_o$ is the half beamwidth at $1/e^2$ intensity point; n is the linear refractive index and $\lambda$ is the optical wavelength in vacuum.

\* \* \* \* \*